United States Patent
Madden, Jr. et al.

(10) Patent No.: US 10,587,754 B1
(45) Date of Patent: Mar. 10, 2020

(54) SYSTEM FOR AUTOMATED CALL ANALYSIS USING CONTEXT SPECIFIC LEXICON

(71) Applicant: TETON1, LLC, Akron, OH (US)

(72) Inventors: Robert T. Madden, Jr., Hudson, OH (US); Christopher P. Derikart, Akron, OH (US); Edward A. Donnelly, Youngstown, OH (US)

(73) Assignee: TETON1, LLC, Akron, OH (US)

( * ) Notice: Subject to any disclaimer, the term of this patent is extended or adjusted under 35 U.S.C. 154(b) by 0 days.

(21) Appl. No.: 16/055,348

(22) Filed: Aug. 6, 2018

Related U.S. Application Data

(63) Continuation of application No. 15/692,027, filed on Aug. 31, 2017, now Pat. No. 10,044,863, which is a continuation of application No. 15/391,962, filed on Dec. 28, 2016, now Pat. No. 9,756,185, which is a continuation-in-part of application No. 14/937,223, filed on Nov. 10, 2015, now abandoned.

(60) Provisional application No. 62/077,652, filed on Nov. 10, 2014.

(51) Int. Cl.
*H04M 3/00* (2006.01)
*H04M 3/42* (2006.01)
*H04M 3/51* (2006.01)
*G10L 15/08* (2006.01)

(52) U.S. Cl.
CPC .......... *H04M 3/5175* (2013.01); *G10L 15/08* (2013.01); *H04M 3/42221* (2013.01); *G10L 2015/088* (2013.01); *H04M 2203/403* (2013.01)

(58) Field of Classification Search
CPC . H04M 3/5175; G10L 15/08; G10L 2015/088
USPC ....... 379/265.01–265.14, 266.01–266.1, 309
See application file for complete search history.

(56) References Cited

U.S. PATENT DOCUMENTS

| | | |
|---|---|---|
| 6,711,253 B1 | 3/2004 | Prabhaker |
| 7,720,214 B2 | 5/2010 | Ricketts |
| 7,864,946 B1 | 1/2011 | Fama et al. |
| 8,051,086 B2 | 11/2011 | Jeffs et al. |
| 8,300,797 B1 | 10/2012 | Benesh et al. |
| 8,715,179 B2 | 5/2014 | Price et al. |
| 8,761,376 B2 | 6/2014 | Pande et al. |
| 8,767,031 B2 | 7/2014 | Wolzien |
| 8,811,593 B1 | 8/2014 | Morrissey |
| 9,160,852 B2 | 10/2015 | Ripa et al. |

(Continued)

FOREIGN PATENT DOCUMENTS

WO   2014039027 A1   3/2014

*Primary Examiner* — William J Deane, Jr.
(74) *Attorney, Agent, or Firm* — Vorys, Sater, Seymour and Pease LLP; Rex W. Miller, II

(57) ABSTRACT

A system and method for automated call analysis using context specific lexicons. A system includes memory and a processor configured to executed instructions. The system includes a recording component, a lexicon component, an analysis component, and a display component. The lexicon component defines a plurality of context specific lexicons, with each context specific lexicon having elements associated with one of a plurality of unique conversation segments. The analysis component configured to identify elements of the context specific lexicons, and associate each identified element with a time location in a telephonic conversation. The display component configured to graphically present a multi-line graph such that the intersections of the lines indicate transitions between the unique conversation segments.

17 Claims, 10 Drawing Sheets

(56) References Cited

U.S. PATENT DOCUMENTS

| | | |
|---|---|---|
| 2006/0072727 A1 | 4/2006 | Bantz et al. |
| 2006/0233349 A1 | 10/2006 | Cooper |
| 2006/0262920 A1 | 10/2006 | Conway et al. |
| 2009/0262920 A1 | 1/2009 | Carretto et al. |
| 2010/0033247 A1 | 12/2010 | Jeffs et al. |
| 2012/0155631 A1 | 6/2012 | Minnich, Jr. et al. |
| 2015/0347951 A1 | 12/2015 | Tamblyn et al. |

SYSTEM FOR AUTOMATED CALL ANALYSIS USING CONTEXT SPECIFIC LEXICON

CROSS-REFERENCE TO RELATED APPLICATIONS

This application is a continuation of U.S. patent application Ser. No. 15/692,027 filed Aug. 31, 2017, which is a continuation of U.S. patent application Ser. No. 15/391,962 filed Dec. 28, 2016, which is a continuation-in-part of U.S. patent application Ser. No. 14/937,223 filed Nov. 10, 2015, which claims priority from U.S. Provisional Application Ser. No. 62/077,652 filed Nov. 10, 2014; the disclosures of which are incorporated herein by reference.

BACKGROUND

Field of Invention

Various configurations of the current invention relate generally to apparatus, systems, and methods for automated call analysis using context specific lexicons. Embodiments of the automated call analysis enable improved tracking of call center performance. In some embodiments, the apparatus, systems, and methods relate to automated call analysis using, for example, automatic speech recognition. Specifically, the apparatus, systems, and methods provide for detecting elements of a context specific lexicon and graphically presenting the analysis results to improve call center performance.

Description of Related Art

Providing quality customer service is increasingly important in today's competitive business environment. Product and service providers need to maintain their existing customers while constantly seeking to acquire new ones. In responding to an inquiry at a typical telephone call system, personnel may answer many incoming calls about a particular product or service each day. In responding to these calls it is important that the responder systematically moves through a progression of questions/dialog to exchange information with each caller so that the caller's question(s) are efficiently answered to his/her satisfaction.

For example, one type of call center call may be best answered and processed as the respondent steps through four different segments of a typical call response process. These segments may include an open/introduction section, a discovery section, a solution/resolution section and a closing section. The call center agent would ask various questions or provide the caller with certain information corresponding to each of these sections in assisting the caller. Currently, it is difficult to monitor call center agents to ensure they spend reasonable and/or appropriate amount of time in each of these sections when responding to calls and/or if they are asking the appropriate questions or prioritizing information in a most efficient order. What is needed is a better way to automatically analyze call center conversations based on a context specific lexicon.

SUMMARY

Presently disclosed is a system for automated call analysis using context specific lexicons. In one embodiment, the system includes a memory to store instructions, and a processor, communicatively coupled to the memory, that executes or facilitates execution of the instructions, in which the instructions include a recording component configured to record a telephonic conversation between a first conversation participant and a second conversation participant; a lexicon component that defines a plurality of context specific lexicons, wherein each of the plurality of context specific lexicons includes elements associated with one of a plurality of unique conversation segments; an analysis component configured to perform automatic speech recognition on the telephonic conversation to identify elements of the context specific lexicons, the analysis component further configured to associate each identified element with a time location within the telephonic conversation at which the element occurred; the analysis component further configured to determine a frequency of occurrence of the elements of each context specific lexicon associated with the corresponding unique conversation segment to identify transitions between the unique conversation segments; and a display component configured to graphically present on a display a multi-line graph, wherein each line corresponds to the frequency of occurrence of the elements of one of the context specific lexicon associated with the corresponding unique conversation segment; such that intersections of the lines indicate transitions between the unique conversation segments. Also disclosed is an apparatus and method for automated call analysis using context specific lexicons.

One embodiment of a method of analyzing phone conversations at a call center includes assigning a plurality of tags to key words and key phrases. While phone conversations in the context of a call center are discussed herein, it is to be appreciated that the other discussions such as taking orders at a fast food restaurant, ordering merchandise and other conversations that have some regular flow or routine to them may be similarly analyzed by other example embodiments of the invention. After the tags have been assigned, tags that occur in phone conversations are then detected. For example, these tags are detected in phone conversations that occur between agents at the call center and outside callers calling the call center. Graphical data corresponding to tags detected in the phone conversations is then presented in at least two dimensions. The two dimensional graphical data permits it to be analyzed to determine a quality of the phone conversations. Additionally, a training plan can be developed for one or more agents at the call center based on the tags detected in the phone conversations and the quality of the phone conversations. Another embodiment is a method of grading a call center agent's performance. The method begins by assigning tags to words and/or phrases. These tags are then detected when the corresponding words are spoken in telephone conversations being conducted at a call center. A grade is then assigned to an agent processing the telephone calls at the call center. The grade is based, at least in part, on tags detected (or not detected) in the telephone conversations or in a correct portion of the telephone conversations. The grade corresponds to a quality of performance level of the agent. In other example embodiments performance can be corrected base on detected tags alone without the need to first assign a grade.

Another configuration is a system of monitoring performance at a call center. The system includes a tag detection logic and a display logic. The tag detection logic detects the occurrences of different tags during a period that a phone conversation is being conducted at the call center. A single tag is associated with a word or a phrase. The display logic graphically presents a number of occurrences of the different tags in a two dimensional format on a display to allow for a graphical review of a quality of the phone conversation.

BRIEF DESCRIPTION OF SEVERAL VIEWS OF THE DRAWINGS

One or more preferred embodiments that illustrate the best mode(s) are set forth in the drawings and in the following description.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Referring now to FIGS. 1-12, an apparatus, system, and method for automated call analysis using context specific lexicons is disclosed. In an embodiment, a system includes a memory to store instructions, and a processor, communicatively coupled to the memory, that executes or facilitates execution of the instructions. The system also includes a recording component configured to record a telephonic conversation between a first conversation participant and a second conversation participant. The system further includes a lexicon component that defines a plurality of context specific lexicons, wherein each of the plurality of context specific lexicons includes elements associated with one of a plurality of unique conversation segments. The system also includes an analysis component configured to perform automatic speech recognition on the telephonic conversation to identify elements of the context specific lexicons, the analysis component further configured to associate each identified element with a time location within the telephonic conversation at which the element occurred. The analysis component is also configured to determine a frequency of occurrence of the elements of each context specific lexicon associated with the corresponding unique conversation segment to identify transitions between the unique conversation segments. The system may also include a display component configured to graphically present on a display a multi-line graph, wherein each line corresponds to the frequency of occurrence of the elements of one of the context specific lexicon associated with the corresponding unique conversation segment; such that intersections of the lines indicate transitions between the unique conversation segments. In some embodiments, the system also includes a scoring component configured to determine a duration of each unique conversation segment based on frequency of occurrence of the elements of the context specific lexicon associated with the corresponding unique conversation segment. The scoring component may also be configured to assign a grade based on a comparison of the determined duration of each unique conversation segment, to a benchmark duration for each unique conversation segment.

Figure 1:
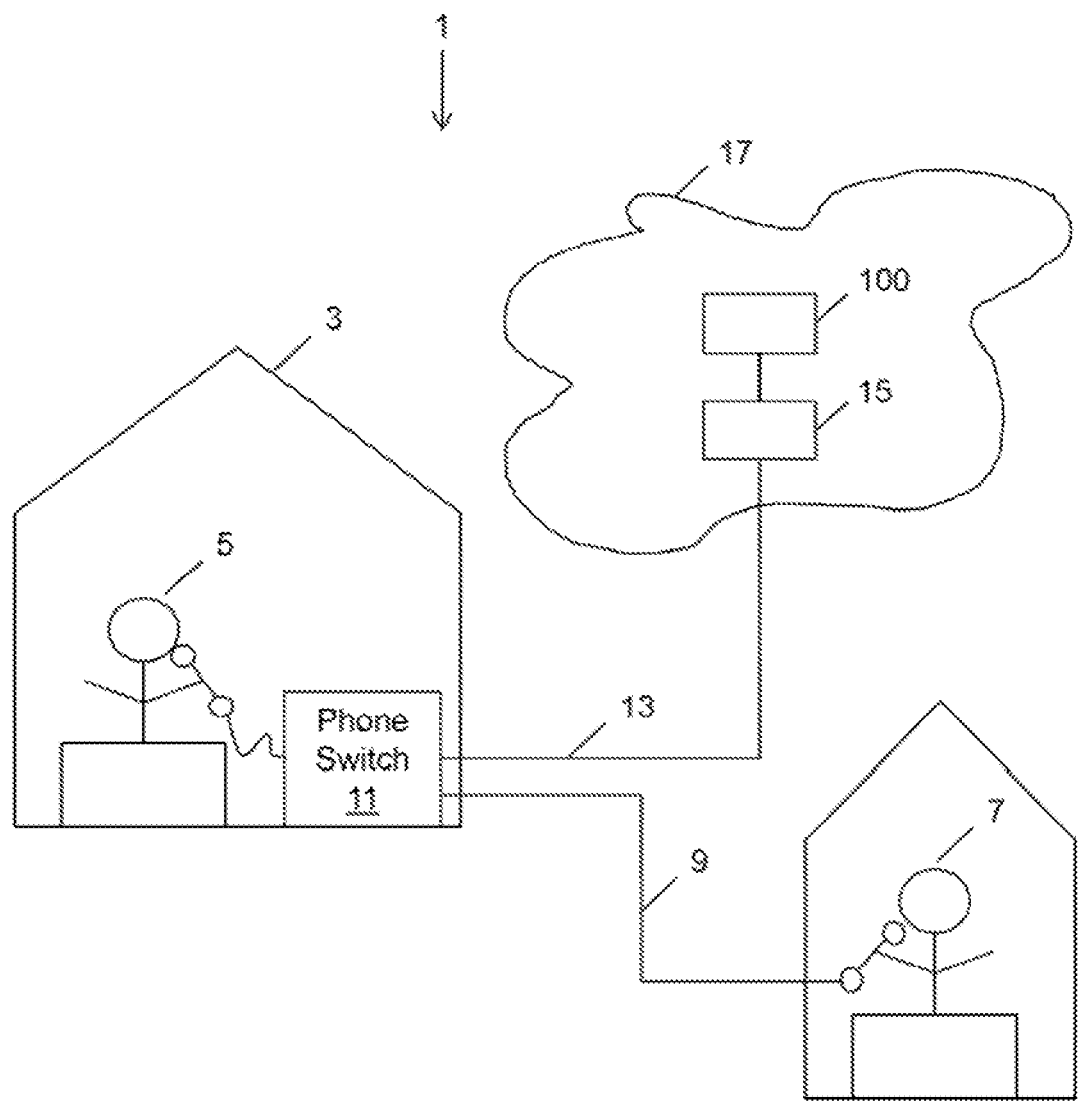
FIG. 1 illustrates one example architecture of a call center monitoring system used to analyze calls being taken at a call center.

FIG. 1 illustrates one example architecture of a call center monitoring system 1 used to analyze calls being taken at a call center 3. As mentioned earlier, the call center 3 is one embodiment of the invention and is used herein for ease of explanation with reference to one example embodiment at a call center 3. Other embodiments include analyzing other routine discussions such as taking orders at a fast food restaurant, analyzing the ordering of merchandise and where conversations have some regular structure and/or flow. Thus a "call" may be other conversations that are not necessarily conducted over a phone and may be real-time vocal conversations at a restaurant or a live online chat (typed), for example.

The example call center monitoring system 1 of FIG. 1 illustrates an agent 5 at a call center 3 having a conversation with a remote caller 7 at a remote location. This conversation is taking place over a telephone link 9 that may include wired and/or wireless portions. The conversation passes through a telephone switch 11 that is located within the call center 3. In embodiments, the conversation is recorded at the switch. In operation, the conversation is collected at the switch 11 and is converted into an unreadable (e.g., encrypted) format at the switch 11. The phone switch 11 can be an Avaya type of phone switch or another type of phone switch as understood by a person of ordinary skill in the art. The unreadable file of the phone conversation (and other conversations) is then transmitted over a communications link 13 from the phone switch 11 to a server/database 15 located in a network cloud 17. Within the cloud 17 the unreadable file is converted back to a readable format. The cloud 17 can be a cloud that is securely operated by Plus One Communications LLC or another entity trusted to process call center phone conversations. The readable data of phone conversations is then processed and analyzed by a phone conversation analysis device 100 as described in detail below.

The phone conversation analysis device 100 searches for and finds keywords and phrases (tags) in phone conversations and then displays this information in a graphical format. This allows a particular agent's conversations to be analyzed to determine if he/she is efficiently processing incoming calls to the call center as well as indicating areas where an agent performs well in handling calls as well as areas where he/she may improve. In other configurations, other predefined parameters other than efficiency may be determined when determining an agent's performance. Knowing a particular agent's performance level allows him/her to undergo targeted and focused training to improve the handling of phone conversations (e.g. efficiency) especially, for example, with regard to troubleshooting problems that callers may be experiencing. Alternatively, if an agent's performance is below a threshold level his/her poor performance may be corrected by terminating the employment or re-assigning the person to other tasks.

Figure 2:
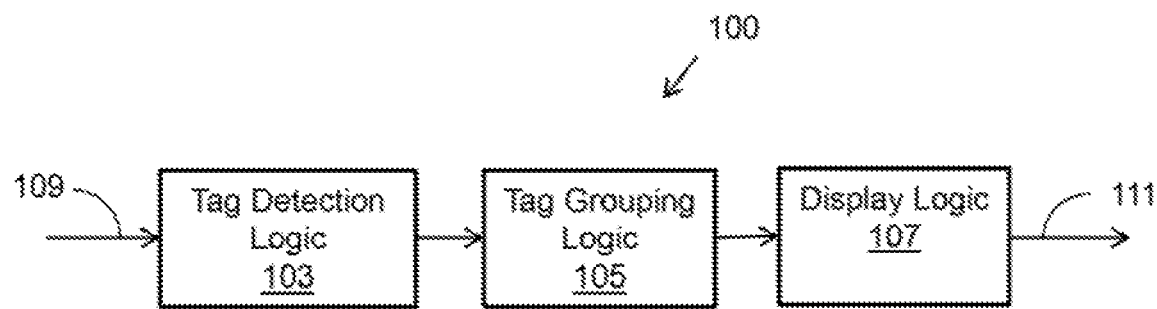
FIG. 2 illustrates an example phone conversation analysis device used to analyze conversations.

FIG. 2 illustrates an example phone conversation analysis device 100 for automated call analysis using context specific lexicons. The phone conversation analysis device 100 includes a tag detection logic 103, a tag grouping logic 105, and a display logic 107. "Logic" or "component", as used herein, includes but is not limited to hardware, firmware, software and/or combinations of each to perform a function(s) or an action(s), and/or to cause a function or action from another logic, method, and/or system. For example, based on a desired application or need, logic may include a software controlled microprocessor, discrete logic such as an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

The tag detection logic 103 receives on an input line 109 data that corresponds to a call that was processed by a call center 3 as discussed above with reference to FIG. 1. The data may be a stream of bytes of data corresponding to an audio recording of a call and/or other calls processed by the call center. For example, the data on input line 109 may have been collected from an Avaya type of telephone switch or another type of telephone switch. In other configurations, data of calls being answered by the call center may be presented to the tag detection logic 103 in real time rather than first being collected and stored.

The primary function of the tag detection logic 103 is to detect predefined tags within the audio presented to it on the input line 109 and count the number of times each tag is detected and/or its location within the conversation. A tag is a predefined word or generally small groups of words that are expected to occur during the handling of an incoming phone conversation at a call center. For example, some type tags may include: "hello, my name is", "account number", "social security number", "the problem is", "repair procedure", "call us back", "competition" and the like. These keywords or phrases comprises elements of a context specific lexicon associated with the opening segment of a conversation. Other keywords or phrases will comprise elements of other context specific lexicons associated with other unique conversation segments, such as the discovery, solution and conclusion segments. In some embodiments, two or more context specific lexicons may have one or more elements in common. Generally, there may be any number of tags or elements that the tag detection logic 103 can be configured to detect but in a typical call the tag detection logic 103 may detect between 9-20 tags out of generally thousands of predefined tags. By way of another example, two or more competitor names such as "Verizon" and "Sprint" may be grouped together into a single tag.

The tag detection logic 103 can use any method as understood by those of ordinary skill in the art to detect the predefined tags. For example, a speech-to-text type of audio processing algorithm such as Apple Incorporated's Siri voice recognition system could be implemented by the tag detection logic 103. Alternatively, a phonic based speech detect system such as the Aurix/Avaya speech analysis engine could also be implemented by the tag detection logic 103 or a combination of speech-to-text and phonics analysis could be used to detect tags.

In addition to collecting tags, the phone conversation analysis device 100 in other configurations can analyze the data received on input line 109 to determine other statistics or other actions that have occurred over a period of time. For example, data can be collected related to a number of times callers have been transferred, the number of times callers have been placed on hold, a number of times a call has been escalated in priority, a number of times a person calls back, total times of phone calls, a number of repeated calls and the like can also be collected.

In the preferred configuration, the tag detection logic 103 is also provided with a tag weight associated with each tag so that when each tag is found a corresponding weight is assigned to it. For example, some tags/keywords such as "may I please have your name" may have a higher weight because it is important to always ask for the caller's name. Other key words of less importance would be assigned a lower weight. As discussed below, the weights contribute to a grade assigned to each call center agent that indicates how well his/her performance is. For example, a letter grade of "A" through "F" may be assigned with an "A" being the best grade and an "F" being the lowest. Upon processing tags as discussed below, detected tags with higher weights would improve an agent's grade more than a tag with a lower weight.

As mentioned above, a call center may process a call using a system that includes different sections of the call where different items are discussed. These sections include by way of example the opening section where the caller is greeted and account information is collected, a discovery section where the problem is diagnosed, a solution section to explain the solution to the caller and a closing/conclusion section. The tag grouping logic 105 groups tags related to each of these sections together. The tags may have been earlier manually assigned into different groups so that the tag grouping logic 105 can sort tags discovered by the tag detection logic 103 into the proper group based on the predefined group assignments. For example, tags such "name", "address", "social security", "account number" would be grouped together into an "opening" group of tags related to the opening section of a phone conversation. Similar groupings would be made for the discovery, solution and conclusion sections. While four segments of a phone call are discussed here, it is understood that in other configurations fewer than four segments or more than four segments could be defined and implemented.

In another configuration, a tag may be included in a particular group only if it fell between a certain percentage of a time range of its associated call. For example, an opening type of tag would only be included in the opening group of tags if it occurred in the first 20 percent of the call or within a certain number of seconds into the call. Similarly, a particular solution tag, "the solution is" for example, would only be valid if it occurred after the 40 percent duration of a call and before the 90 percent duration of the call. This is because some tags may lose their analytical value if they occur too far from where they may be expected, so the display logic 107 would not include them (or would reduce the weighted value) in creating one or more of the displays discussed below. In general, tags may be measured by a percentage value or a unit of time value where they occur in a conversation.

The display logic 107 can create a variety of charts by first generating display data to be displayed on a monitor. For example, the display logic 107 may generate VGA data corresponding to a chart that is output on line 111 so that it can be delivered to a monitor and displayed. In general, two dimensional charts are generated and then can be used to rapidly interpret how call agents are handling client calls. Charts can be generated, by way of example, using data collected over any time period for a single agent, a group of agents and for agents in one or more geographical areas.

Figure 3:
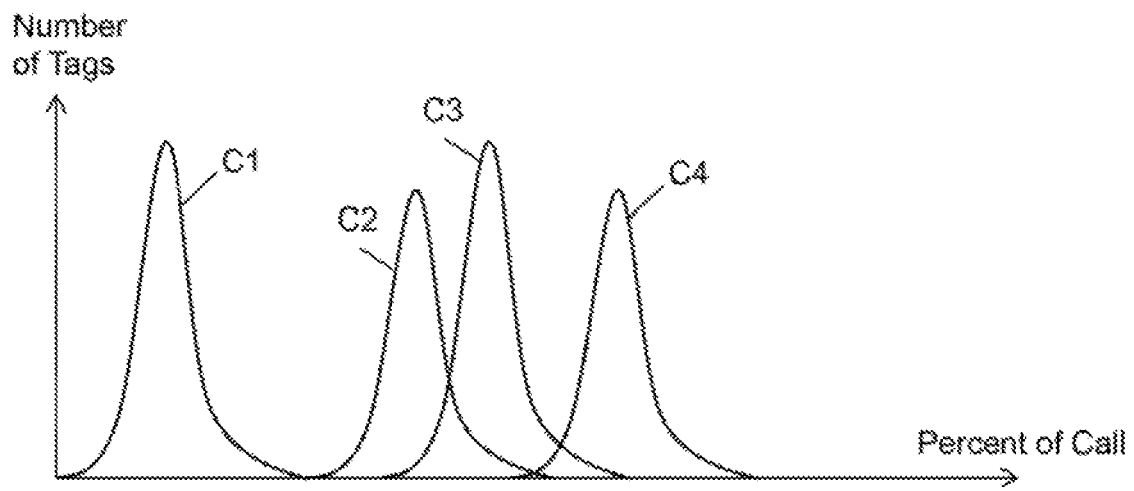
FIG. 3 illustrates an example plot of the location of tags within phone conversations.

In one configuration, as illustrated in FIG. 3, the display logic 107 graphs tag data associated to the opening, discovery, solution, and conclusion sections after tags belonging to these sections have been sorted by the tag grouping logic 105. As can be seen in this figure, an opening curve C1 representing a collection of the opening related tags of the opening section is located at the left side of the graph. The opening curve C1 is followed by a discovery curve C2, a solution curve C3, and a closing curve C4 representing their respective sections of a phone conversation. In some configurations, curve smoothening and/or fitting algorithms can be performed on these curves C1-4.

In the preferred configuration, the display logic 107 displays the opening, discovery, solution, and conclusion curves C1-4 so that the curves represent where in a particular call the associated groups of tag were detected by the tag detection logic 103. These locations are illustrated in FIG. 3 as a percent of the total time of that particular call. Notice that these curves C1-4 are two dimensional in that they show in what time percentage of the call they occur and by what magnitude.

Analysis of many calls indicates that there is a preferred place where the introduction section should end and when the discovery, solution, and conclusion sections should begin and end. For example, ideally an agent should strive to have the introduction/opening section completed within the first 10 percent of the call because an opening of this duration gets to discovery faster and shortens the overall length of the call. Additionally, an overlap between the discovery and solution sections may indicate that a call center agent is confused. In assisting an agent in improving his/her productivity, a call center can allow an agent to only see his/her own data while allowing a supervisor to see multiple agents' data. Given the large volume of calls handled at some call centers, the analysis of these curves C1-4 that results in improved training of call center agents can lead to a considerable amount of money being saved. As previously mentioned, if an agent's performance is consistently below a certain threshold, it may be determined it is best to terminate his/her employment.

Figure 4:
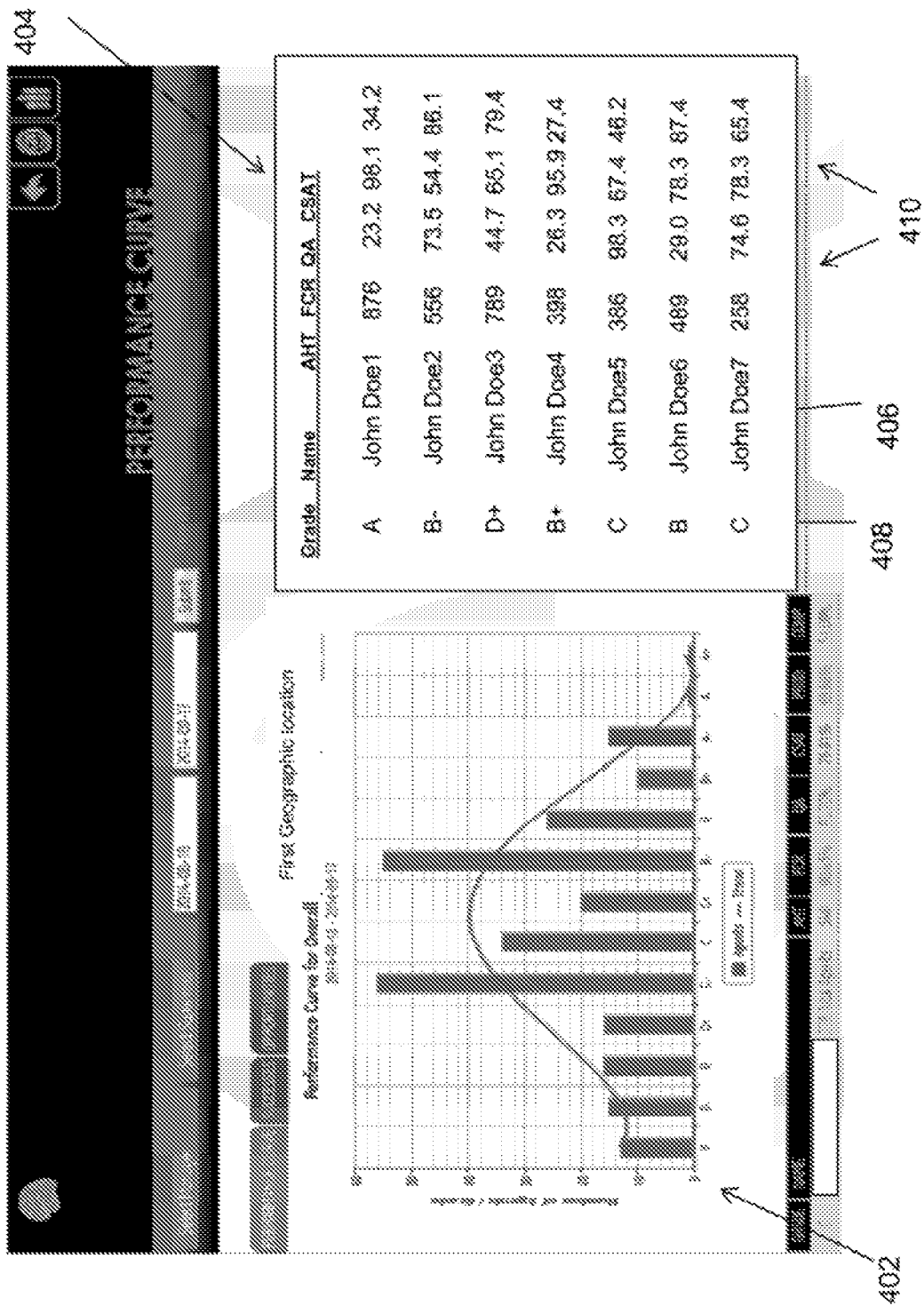
FIG. 4 illustrates an example chart of grades assigned to call center agents.

The display logic 107 can generate a variety of other charts some of which are by, further example, illustrated in FIGS. 4-9. FIG. 4 illustrates an example graph 402 showing how many call center agents received a particular grade. As mentioned earlier, a call agent's letter grade depends on him/her saying the right tag phrases at the right time. Additionally, his/her grade also depends on saying higher weighted tags more often than lower weighted tags or failing to mention important tags. In some configurations, words/tags that may not be preferred to be mentioned such as a competitor's name, undesirable words, or suggesting to "callback later" may even carry a negative weight and would act to lower an agent's grade. In some configurations, a grade may also depend on one or more key performance indicators (KPIs) that are discussed below. FIG. 4 also includes a table 404 listing some agent names 406, their grades 408 as well as other various scores 410 that may impact the grades. Training can be focused on what is needed. Knowing agents grades and what type of tags agents are using can improve training to save both time and money. For example, only the agents needing training in areas related to a first group of tags can be trained in one type of training and agents needing training with respect to a second group of tags can be specifically trained with another type of training focused on a second group of tags.

Figure 5:
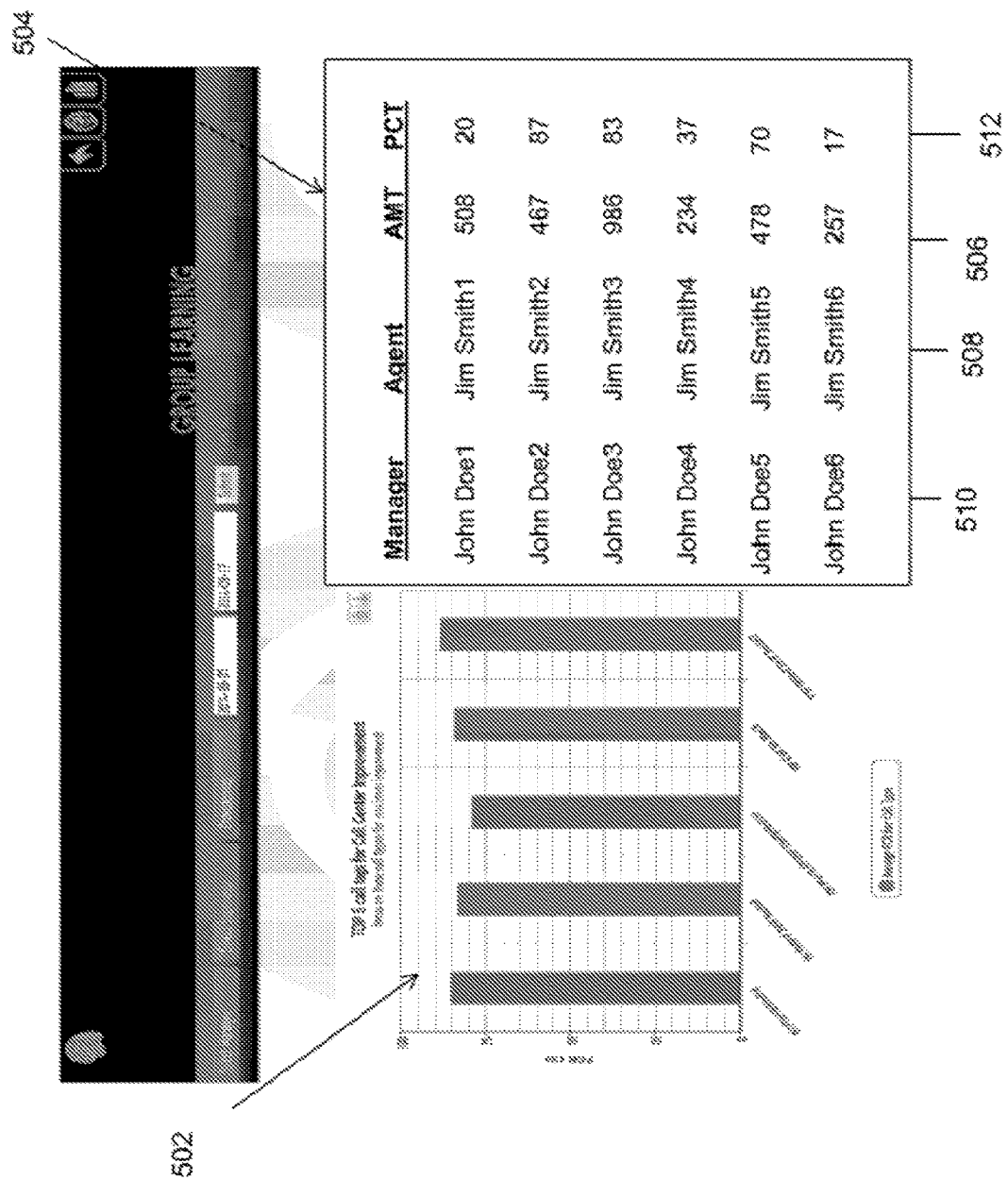
FIG. 5 illustrates an example chart of the top five tags being analyzed to improve a call center.

FIG. 5 illustrates an example chart 502 generated by the display logic 107 that displays the top five call types, identified by unique tags or a collection of tags, as well their associated frequency expressed as a percentage. This chart 502 provides a quick visual tool indicating how often undesirable tags are being used by an agent or a group of agents. A table 504 can also be displayed listing agent names 506, their supervisor 508, and how many times these five tags were used 510 along with an associated percentage 512.

In another configuration, a tag table may be generated that includes a list of tags sorted according to whether they correspond to the opening/greeting, discovery, or solution sections. The table may also include a field for the number of times that each tag was encountered, a field for a number of calls associated with each tag as well as other fields of interest associated with the tags and calls.

In other configurations, the display logic 107 can generate other displays of graphs and charts so that other dynamics of an enterprise that has many call centers may be viewed. For example, a summery page may be generated that compares the quality of phone calls or other conversations of two or more call centers. Calls may be further sorted by manager, supervisor, and/or agents. In other displays, calls may be further sorted based on call type, as discussed in more detail below, and sorted based on one or more other conversation quality factors.

Figure 6:
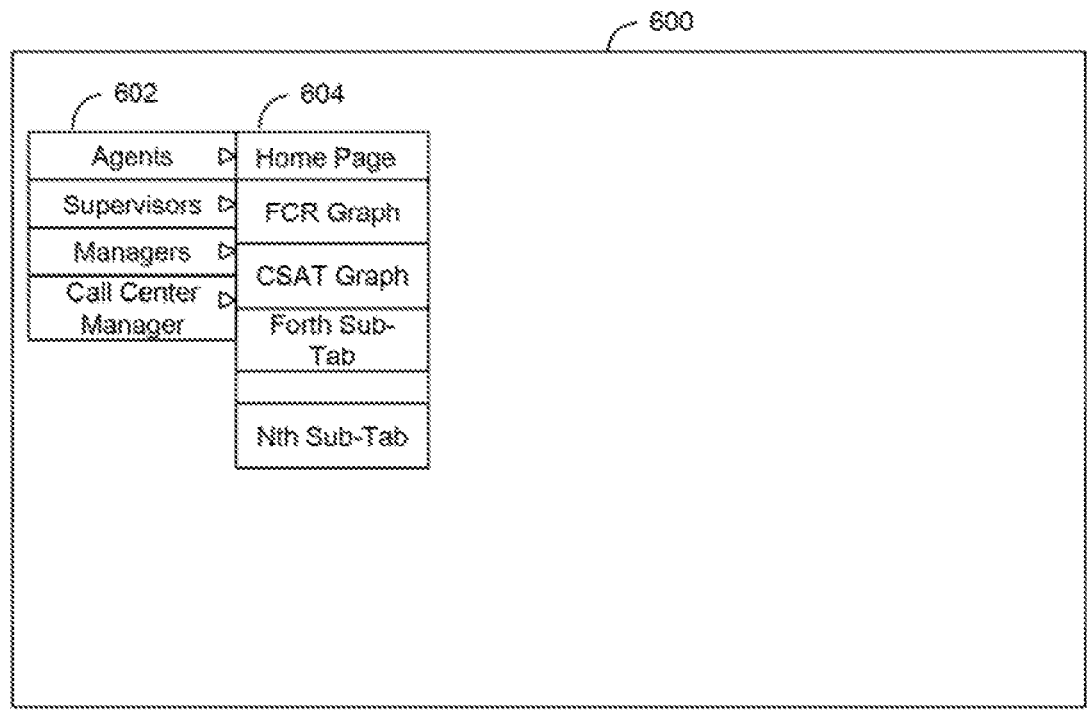
FIG. 6 illustrates an example display to allow one to select a screen associated with an agent (customer service representative (CSR)), a supervisor, a manager, or a manager to descend to another page to display data associated with the selected personnel.

FIG. 6 illustrates an example display 600 generated by the display logic 107 to allow one to select one of the tabs 602 for an agent (customer service representative (CSR)), supervisor, manager, or a call center manager to descend to another page to display data associated with the selected personnel. For example, the "agents" tab may be selected followed by the sub-tab 604 for "home page". This would bring up an example agent home page 700 for a particular agent 702 as illustrated in FIG. 7.

Figure 7:
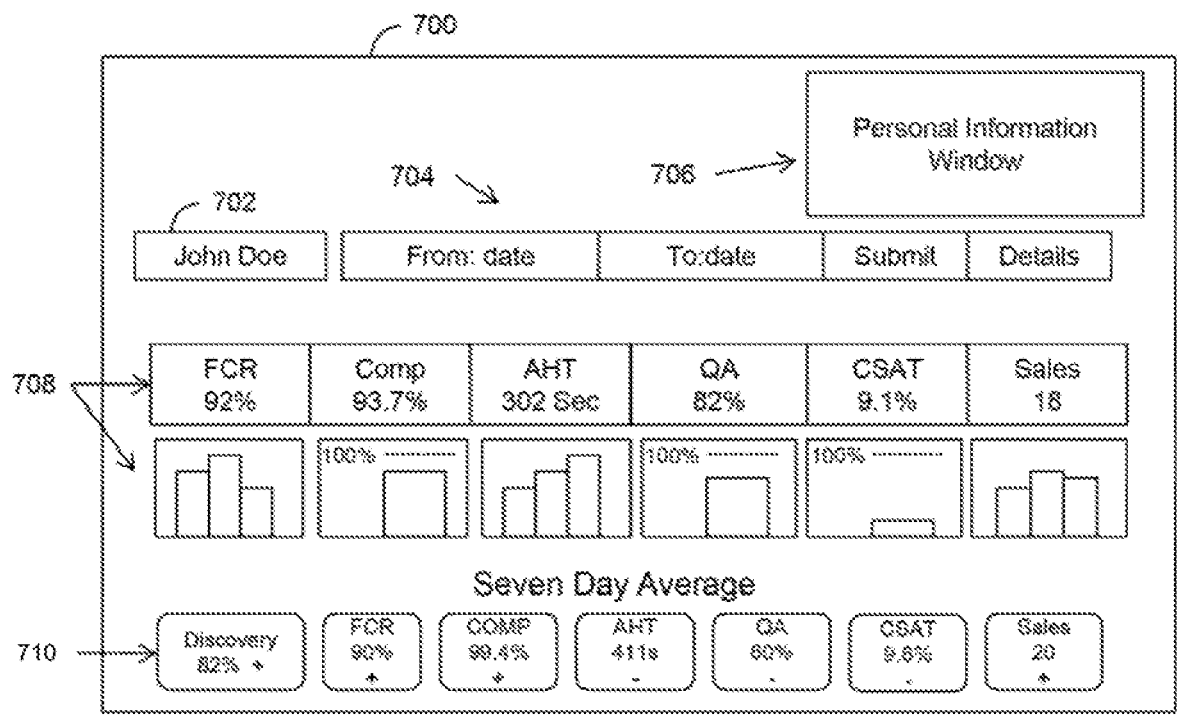
FIG. 7 illustrates an example agent home page for a particular agent illustrating a few key performance indicators (KPIs).

It may be best to view the illustrated agent page of FIG. 7 as having four separate areas: a search area 704, a personal area 706, a selected statistics area 708, and a rolling seven day statistics area 710. The search area includes "From" and "To" fields that allow one to select a starting date and an ending date. Data between these two dates is used generate the statistics generated in the selected statistics area 708. The personal area 706 may display an agent's supervisor name as well as the agent's work schedule and other information of importance relative to an agent.

In some embodiments, the computer 1100 discussed below with reference to FIG. 11 may be configured to use data generated by the tag detection logic 103 and the tag grouping logic 105 to generate key performance indicators (KPIs) that are displayed in the selected statistics area 708 and the rolling seven day statistics area 710. The computer 1100 in other embodiments, may calculate KPIs that do not depend on tags but, instead, are based on the timing or other characteristics of a conversation of interest. In some instances, KPIs provide some indication as to how successful a call or group of calls has been processed. For example, a first call resolution (FCR) KPI is an indication if an agent was able to successfully handle an incoming call without the caller needing to callback within a certain time window. In FIG. 7, in the selected statistics area 708 the FCR is 92 percent and in the rolling seven day statistics area 710 it is 90 percent. Another example KPI may be an average hold time (AHT) which may indicate an average time an agent spends with each caller. In the selected statistics area 708 this value is 302 seconds and in the rolling seven day statistics area 710 it is 411 seconds. In some embodiments, the rolling seven day statistics area 710 may calculate and display KPI data for a different number of days than seven days. In some configurations, holding a curser over a graph of a KPI in the selected statistics area 708 will cause data for particular line of business associated with that KPI to be displayed. Clicking on a particular KPI in the selected statistics area 708 will follow a hyperlink to a page with more detailed information about the KPI score. Some KPIs such as FCR and AHT will display data for different call types so that an agent may focus on improving one or more particular call types.

When some KPIs in the selected statistics area 708 are clicked on, a soundtrack adherence graph may also optionally be displayed. The curves in this graph are based on the parts of a call (opening, discovery, solution, and conclusion curves) discussed above with reference to FIG. 3 and illustrates how well an agent progresses through those portions of a call for that particular KPI. As previously introduced above with reference to FIG. 3, the opening curve C1 graphically displays where and for how long an agent or a group of agents spends time verifying a caller. If this curve C1 is too short then key customer verification requirements may be missed at the risk of putting the customer and the agent's company at risk. If it is too long, then the agent may just need training on how to be more efficient. To improve FCR, focus may be on the overlap between the discovery curve C2 and the solution curve C3. Too much overlap may indicate that an agent tries to resolve problems with an inefficient "trial and error" approach or a "lets try this because it usually works" approach. Too much of a gap between two curves may indicate too much dead time that may be possible to correct. Other parts of a call may also be displayed in other graphs, for example, a bar graph of discovery key words may optionally be displayed.

The rolling seven day statistics area 710 provides a quick indication whether an agent is improving or is within an acceptable range. A green "plus" sign (+) or a red minus sign (−) may be displayed near each item in the rolling seven day statistics area 710 to further indicate whether an agent is improving with respect to a KPI or has a score within an acceptable range for that KPI. In some embodiments, the agent home page 700 may include a reporting area allowing the agent and their supervisor to document training and other useful information concerning an agents handling of phone or other conversations.

In addition to the KPIs of FCR and AHT, other KPIs may include customer satisfaction (CSAT), after call work (ACW) which is sometimes referred to as WRAP, compliance (Comp %), quality assurance (QA), and productivity. ACW/WRAP is a phone mode an agent is put into after a call to notate a customer's account. Comp % is a percent of time an agent worked their schedule. QA may be a manually created quality checklist such as checking an agent uses a customer's last name, verifies the customer' identity, says please and thank you, etc. There may be many other KPIs and KPIs may be tailored to a specific business type or unit and may be tailed for specific types of calls or conversations.

For example, one set of KPIs may be useful when analyzing technical trouble shooting conversations and other KPIs may be more useful to analyze conversations related to sales and marketing.

In some configurations, the call center monitoring system 1 (FIG. 1) can use tags and voice analytics to generate the values of some KPIs. Additionally, the call center monitoring system 1 may also automatically, monitor and generate KPIs related to customer satisfaction (QA) without the need of having a caller fill out a questioner.

Figure 8:
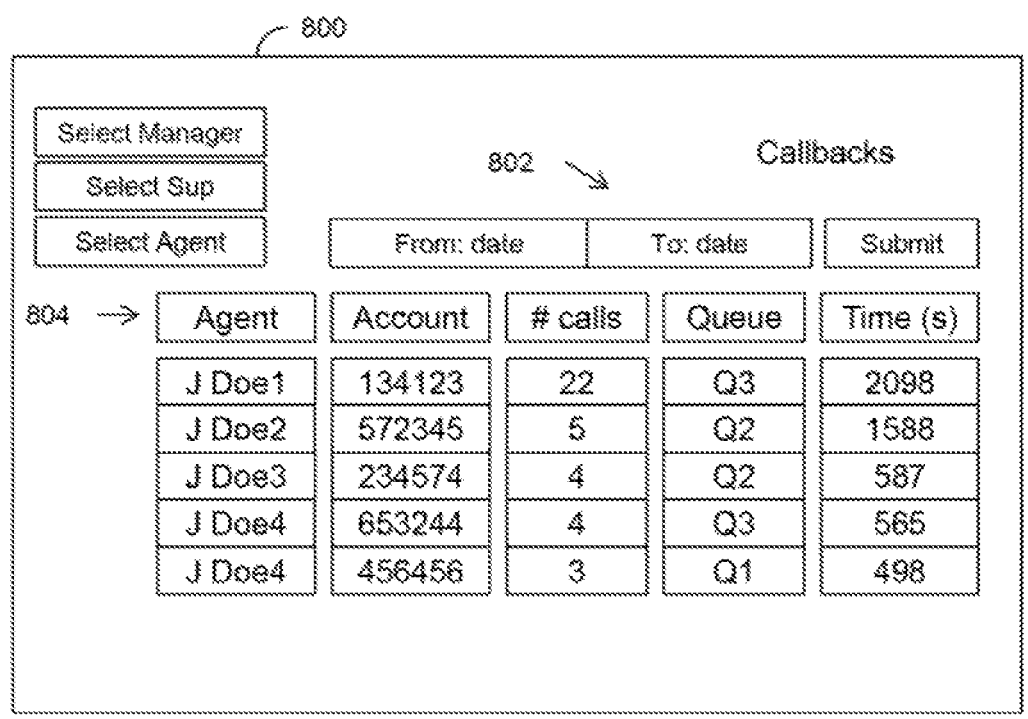
FIG. 8 illustrates an example callback screen.

In other configurations, the searching of tags by the phone conversation analysis device 100 (FIG. 1) can also provide ways to analyze and reduce callbacks where a caller recalls the call center one or more times regarding the same problem. For example, the display logic 107 (FIG. 2) can graphically display tags associated with a particular callback or a group of callbacks. This data can then be viewed for clues as to how to reduce the number of callbacks. FIG. 8 illustrates an example of a display illustrating an example callback screen 800. This may illustrate all accounts where a customer called back into a call center when their inquiry or issue was not resolved in a single first call. Dates may be placed in the "From" and "To" fields 802 to display all account numbers where more than a single call was made between these two dates.

After entering the dates, a "submit" button may be pressed to display all accounts that had multiple calls between the submitted dates. As illustrated, the calls may be listed from most callbacks downward to fewer callbacks and may include fields indicating the first agent taking the first call, account number, number of callbacks, a queue the first call was received at, and a total time of all the calls in seconds. In some embodiments, an account number may be clicked on to bring up a list of every call made by that account number to allow one to click on each call in order to hear a recording of each call made by that account number for the specified time period.

Figure 9:
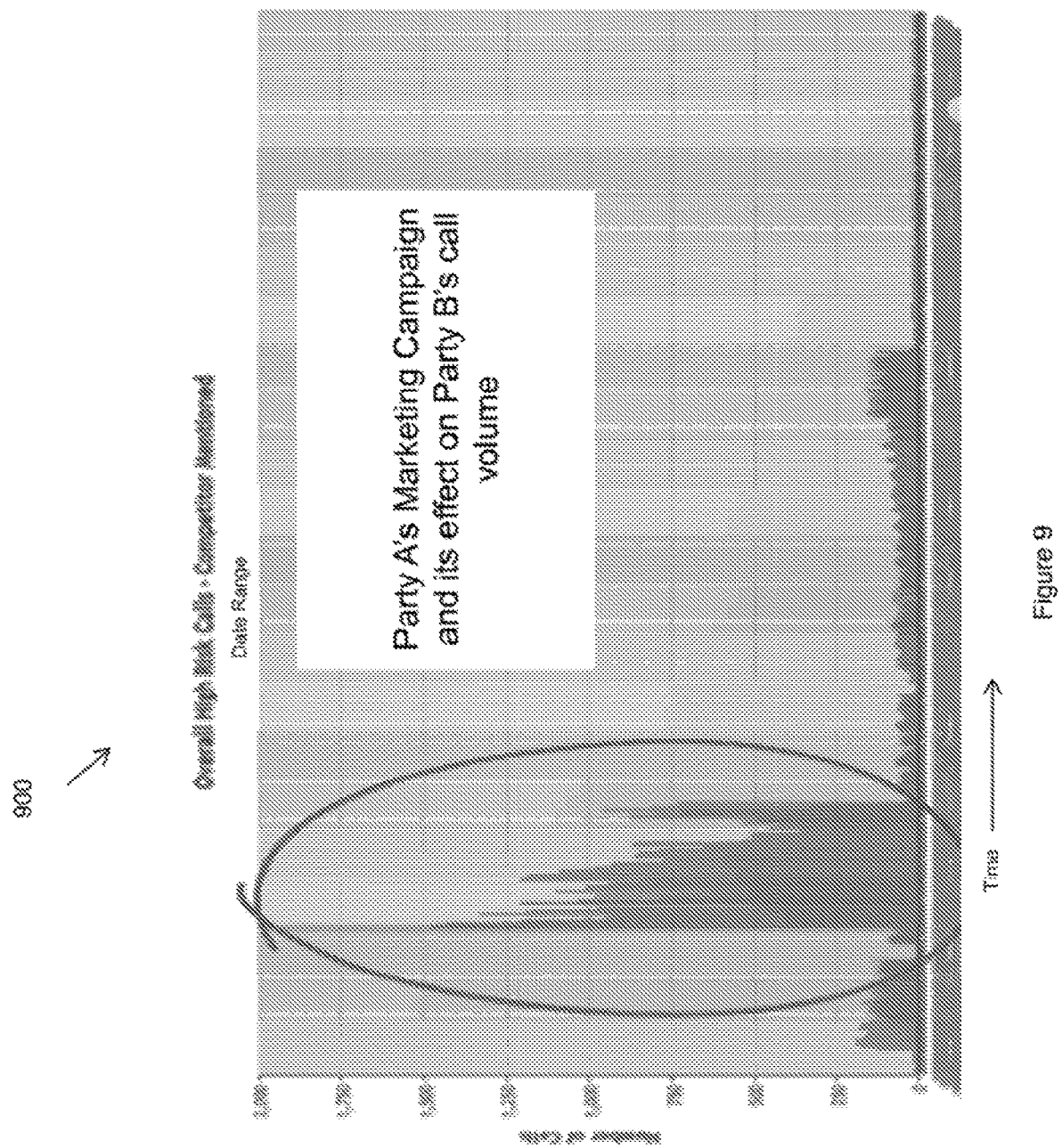
FIG. 9 illustrates an example screen shot of high risk calls where a competitor is mentioned.

As illustrated in FIG. 9, names of competitors can be included as tags and the display logic 107 can be configured to graphically display when customers mention a competitors name over many months or years. This may graphically provide information related to a competitor's yearly or periodic product promotions or indicate if an internal sale campaign is effective. As another example, tags associated with selling a product may be graphed together to better understand which agents are doing a better job of selling a product according to predetermined expectations.

The use of the phone conversation analysis device 100 can in some configurations provide for real-time upselling. For example, if a caller is mentioning words associated with tags related to a particular product or service, then the display logic 107 may generate a display to prompt the call center agent to suggest that product or service to the caller.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 10:
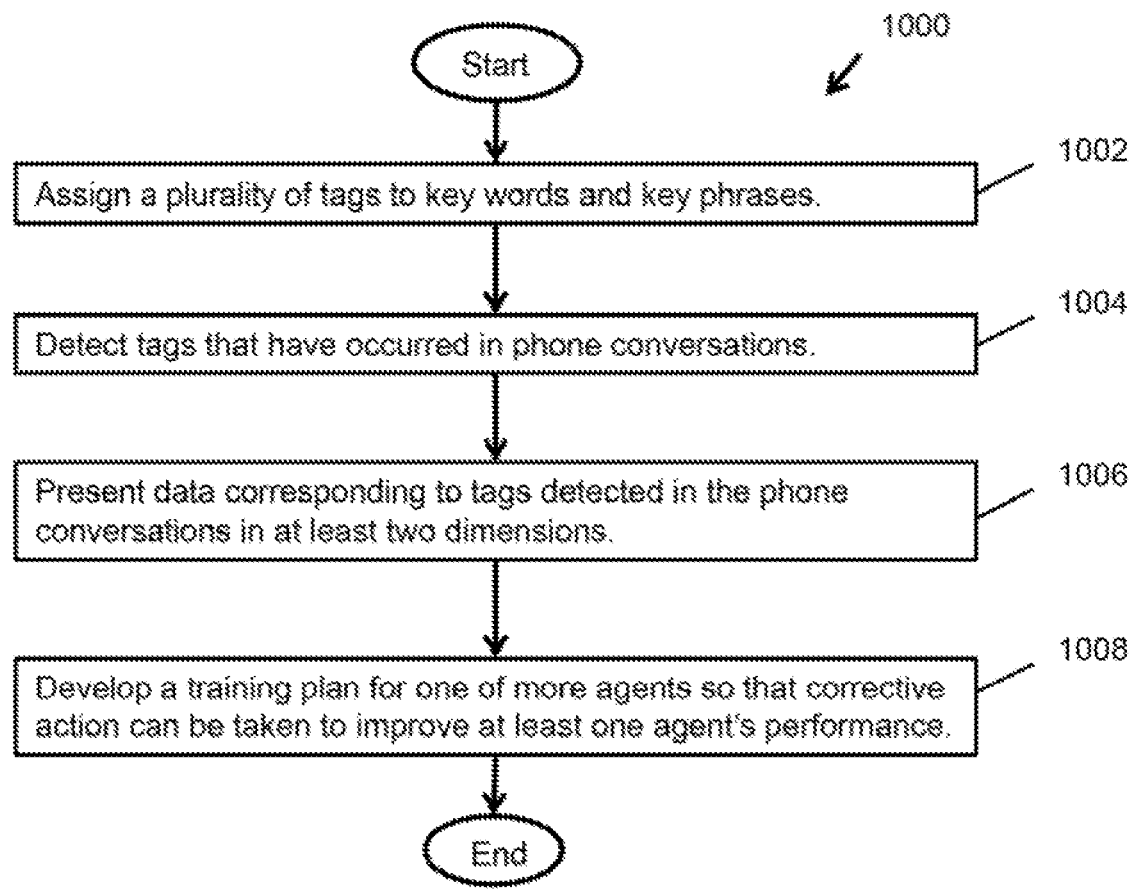
FIG. 10 illustrates an example embodiment of a method for analyzing conversations.

FIG. 10 illustrates a method 1000 of analyzing phone conversations at a call center. The method begins by assigning a plurality of tags, at 1002, to key words and key phrases. Tags that have occurred in phone conversations are then detected, at 1004. These tags are detected in phone conversations that have occurred between agents at the call center and outside callers calling the call center. The tags may be detected using a phonics based method as discussed above. Graphical data corresponding to tags detected in the phone conversations is then presented in at least two dimensions, at 1006. The two dimensional graphical data permits it to be easily analyzed to determine a quality of the phone conversations. Additionally, a training plan can be developed, at 1008, for an agent at the call center that had the phone conversation so that his/her performance can be improved. The training plan is based, at least in part, on the tags detected in the phone conversations indicating the performance of the phone conversations as compared to expectations.

Figure 11:
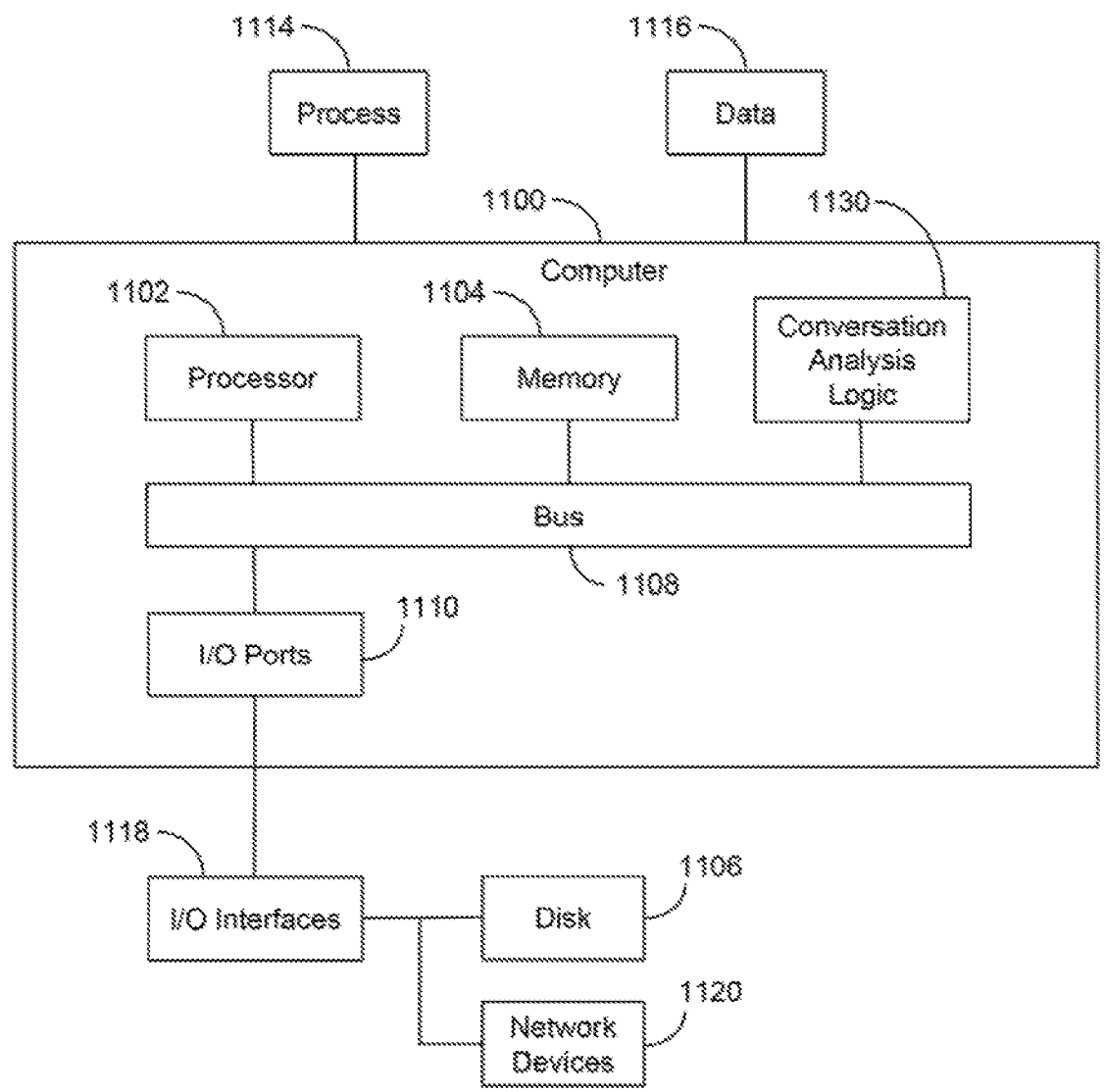
FIG. 11 illustrates an example embodiment of a computer system for analyzing conversations.

FIG. 11 illustrates an example computing device in which example systems and methods described herein may operate. The example computing device may be a computer 1100 that includes a processor 1102, a memory 1104, and input/output ports 1110 operably connected by a bus 1108. In one example, the computer 1100 may include a conversation analysis logic 1130 configured to look for tags in phone conversations where tags are as described above. In different examples, the conversation analysis logic 1130 may be implemented in hardware, software, firmware, and/or combinations thereof. Thus, the logic 1130 may provide means (e.g., hardware, software, firmware) for searching for tags in phone conversations and then generating at least two dimensional graphical images based on the discovered tags. While the logic 1130 is illustrated as a hardware component attached to the bus 1108, it is to be appreciated that in one example, the logic 1130 could be implemented in the processor 1102.

Generally describing an example configuration of the computer 1100, the processor 1102 may be a variety of various processors including dual microprocessor and other multi-processor architectures. A memory 1104 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DRRAM) and the like.

A disk 1106 may be operably connected to the computer 1100 via, for example, an input/output interface (e.g., card, device) 1118 and an input/output port 1110. The disk 1106 may be, for example, a magnetic disk drive, a solid state disk drive, a floppy disk drive, a tape drive, a Zip drive, a flash memory card, and/or a memory stick. Furthermore, the disk 1106 may be a CD-ROM, a CD recordable drive (CD-R drive), a CD rewriteable drive (CD-RW drive), and/or a digital video ROM drive (DVD ROM). The memory 1104 can store a process 1114 and/or a data 1116, for example. The disk 1106 and/or the memory 1104 can store an operating system that controls and allocates resources of the computer 1100.

The bus 1108 may be a single internal bus interconnect architecture and/or other bus or mesh architectures. While a single bus is illustrated, it is to be appreciated that the computer 1100 may communicate with various devices, logics, and peripherals using other busses (e.g., PCIE, SATA, Infiniband, 1384, USB, Ethernet). The bus 1108 can be types including, for example, a memory bus, a memory controller, a peripheral bus, an external bus, a crossbar switch, and/or a local bus.

The computer 1100 may interact with input/output devices via the input/output interfaces 1118 and the input/output ports 1110. Input/output devices may be, for example, a keyboard, a microphone, a pointing and selection device, cameras, video cards, displays, the disk 1106, the network devices 1120, and so on. The input/output ports 1110 may include, for example, serial ports, parallel ports, USB ports and the like.

The computer 1100 can operate in a network environment and thus may be connected to the network devices 1120 via the input/output interfaces 1118, and/or the input/output ports 1110. Through the network devices 1120, the computer 1100 may interact with a network. Through the network, the computer 1100 may be logically connected to remote computers. Networks with which the computer 1100 may interact include, but are not limited to, a local area network (LAN), a wide area network (WAN), and other networks. The networks may be wired and/or wireless networks.

Figure 12:
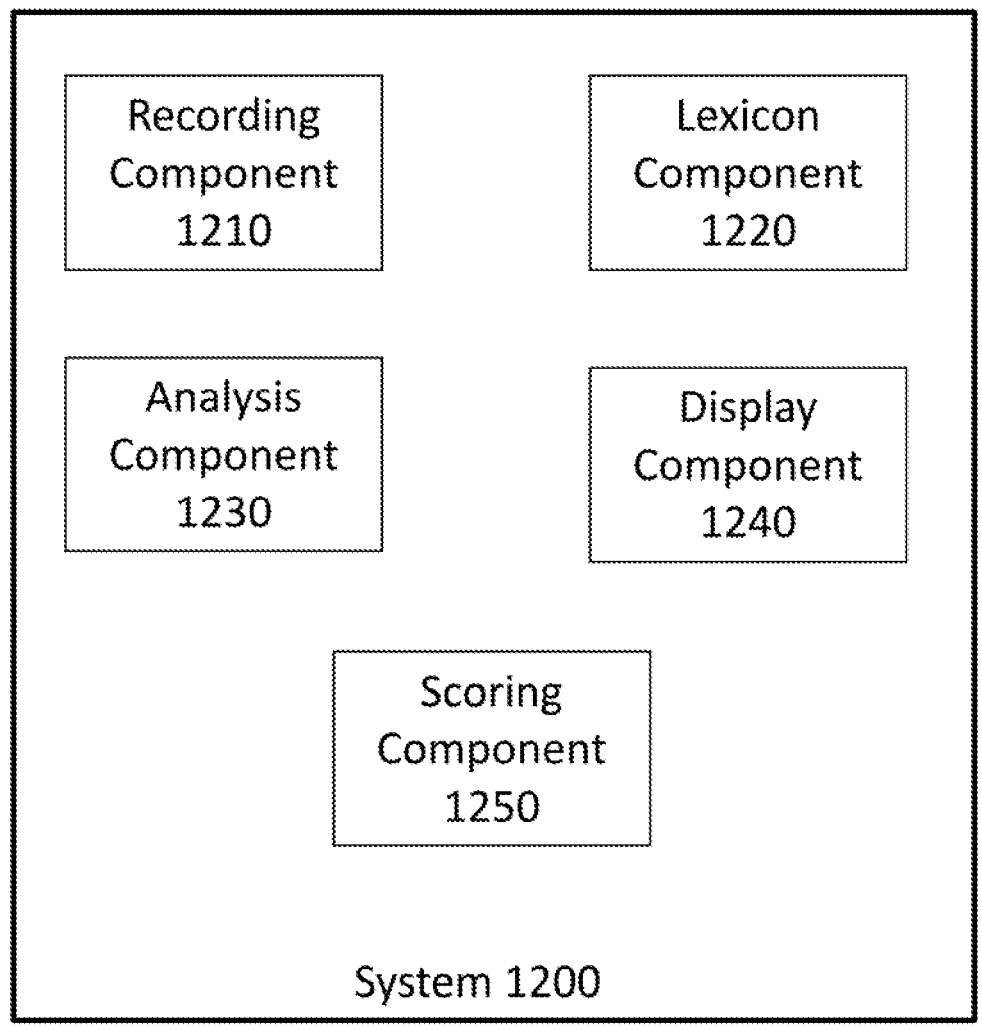
FIG. 12 illustrates another example embodiment of a computer system for analyzing conversations.

Referring now to FIG. 12, a system for automated call analysis using context specific lexicons is further illustrated. As shown, the system 1200, includes a recording component 1210, a lexicon component 1220, an analysis component 1230, and a display component 1240. The system may also include a scoring component 1250. As previously discussed, a conversation may be recorded by the recording component 1210 and thereby made available for subsequent analysis. The recording component 1210 may further be configured to record multiple simultaneous conversations, which may be analyzed in real-time or near real-time using the methods and systems presently disclosed. The lexicon component 1220 defines the plurality of context specific lexicons, in which each context specific lexicon includes elements associated with one of the plurality of unique conversation segments. As previously discussed, the unique conversation segments may be defined as "opening", "discovery", "solution", and "conclusion"; however addition or different segments may be defined depending upon the application in which the system is employed. Regardless, each unique conversation segment is associated with a plurality of elements, which may be keywords and/or phrases, associated with the segment. The plurality of elements form the lexicon specific to the context of the conversation segment providing the context specific lexicon. The analysis component 1230 may include one or more of the tag detection logic and/or the tag grouping logic previously described. The analysis component 1230 identifies elements of the context specific lexicons occurring in the conversation, using at least automatic speech recognition to detect the keywords and phrases. The analysis component 1230 further identifies the time location within the conversation at which each element occurred so that a frequency of occurrence of the elements can be determined. Using this information, the analysis component finally identifies the transitions between the unique conversation segments based on a comparison of the frequency with which the elements of each context specific lexicon are found to occur. As described above in connection with FIG. 3, a multi-line graph is displayed by display component 1240 illustrating the relative occurrence of the elements of each context specific lexicon throughout the duration of the call. As shown, the transition between each unique conversation segment is identified by the intersection of the lines on the graph (e.g. intersection of C1 and C2 identifies the transition between the opening and discovery conversation segments). In a similar manner, the area under adjacent lines indicates the degree of overlap between unique conversation segments, which suggests an inefficient or a typical flow of the call that require further investigation. The scoring component 1250 may assign a grade to the conversation based on a variety of factors as previously discussed. In one example, the scoring component determines a duration for each unique conversion segment and assigns a grade to the conversation based on how closely the duration of each segment conforms to a benchmark duration for such segment. In another example, the scoring component determines the area of overlap as discussed above, and assigns a higher grade to those conversation is less overlap and a lower grade to conversations as the amount of overlap increases. In this manner, conversations may be automatically analyzed and scored using the context specific lexicon to improve call center performance.

In the foregoing description, certain terms have been used for brevity, clearness, and understanding. No unnecessary limitations are to be implied therefrom because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A system comprising:
a memory to store instructions;
a processor, communicatively coupled to the memory, that executes or facilitates execution of the instructions, the instructions comprising:
a recording component configured to record a plurality of telephonic conversations between a plurality of first conversation participants and a plurality of second conversation participants;
a lexicon component that defines a plurality of context specific lexicons, wherein each of the plurality of context specific lexicons includes elements associated with one of a plurality of unique conversation segments;
an analysis component configured to perform automatic speech recognition on the telephonic conversation to identify elements of the context specific lexicons, the analysis component further configured to associate each identified element with a time location within the telephonic conversation at which the element occurred;
the analysis component further configured to determine a frequency of occurrence of the elements of each context specific lexicon associated with the corresponding unique conversation segment to identify transitions between the unique conversation segments; and
a scoring component configured to determine a duration of each unique conversation segment based on the identified transitions between the unique conversation segments based on the frequencies of occurrence of the elements of the context specific lexicons associated with the corresponding unique conversation segments;
the scoring component further configured to automatically calculate at least one key performance indicator (KPI) associated with a quality factor of the plurality of telephonic conversations based on the determined duration of each unique conversation segment; and
a display component configured to display the at least one KPI to allow a person to review the at least one KPI to determine if one or more of the plurality of first conversation participants involved in the at least one conversation requires further training to improve a handling of the plurality of telephonic conversations.

2. The system of claim 1, wherein the plurality of telephonic conversations includes a plurality of different conversations conducted by a plurality of different call center agents.

3. The system of claim 2, wherein the system is further configured to sort and display the at least one KPI based on at least one of the group of: agent supervisor, agent manager, and individual agent.

4. The system of claim 2, wherein the at least one KPI includes at least one first KPI of a first call center and at least one second KPI of a second call center and, wherein the system is further configured to display the at least one first KPI and the at least one second KPI beside each other to compare the first call center with respect to the second call center.

5. The system of claim 1, wherein the system is further configured to receive a start date and an end date from a graphical user interface, and wherein the display component is further configured to display an average value of the at least one KPI based, at least in part, on the start date and an end date.

6. The system of claim 5, wherein the system is further configured to display the at least one KPI in a selected statistics area of a display, and wherein the system is further configured to display the at least one KPI in a rolling day statistics area of the display based on a rolling number of days that is different than a number of days from the start date and an end date.

7. The system of claim 6, wherein the system is further configured to provide an indicator near each of the at least one KPI in the rolling day statistics area of the display to indicate if each of the at least one KPI is improving or not improving based on the at least one KPI in the rolling day statistics area.

8. The system of claim 7, wherein the system is configured to display a green "plus" sign indicator when one of the at least one KPI is improving and is configured to display a red "minus" sign indicator when one of the at least one KPI is not improving.

9. The system of claim 6, wherein the system is further configured to display the at least one KPI in a rolling day statistics area of the display based on a rolling number of days that is between five days and 15 days.

10. The system of claim 1, wherein the system is associated with a call center and the at least one KPI is a tag associated with a competitor's name of the call center, and wherein the system is configured to display the tag associated with a competitor's name based, at least in part, a number of times the tag associated with a competitor's name is mentioned over a period of time.

11. The system of claim 1, wherein the system is adapted to be used to analyze the plurality of telephonic conversations at a call center, and wherein the at least one KPI is one or more tag terms indicating one party of the plurality of telephonic conversations is mentioning a product of a competitor of the call center.

12. The system of claim 1, wherein the system is configured to sort the at least one KPI according to a first KPI and a different second KPI and to graphically display the at least one KPI based, at least in part, on the sorted first and second KPI.

13. The system of claim 1 wherein the system is configured to sort the at least one KPI according to a first KPI and a geographical area the plurality of telephonic conversations occurred at and to graphically display the at least one KPI based, at least in part, on the first KPI and the geographical area.

14. The system of claim 1, wherein the at least one KPI is associated with an individual agent conducting at least one of the plurality of telephonic conversations, wherein the system is configured to assign a letter grade to one or more of the at least one KPIs, and wherein the system is further configured to graphically display the at least one KPI based, at least in part, on the one or more letter grades.

15. The system of claim 1 wherein the system is configured to sort the at least one KPI according to a first KPI and a call type and to graphically display the at least KPI based, at least in part, on the first KPI and a call type.

16. The system of claim 1, wherein the at least one KPI is one or more of the group of: first call resolution (FCR), average handle time (AHT), customer satisfaction (CSAT), after call work (ACW), compliance (Comp %), quality assurance (QA), and productivity, wherein Comp % is a percent of time an employee worked their schedule, and QA is a manually created quality checklist for checking that an agent used a customer's last name, verifies the customer's identity, and says please and thank you.

17. The system of claim 1, wherein the plurality of telephonic conversations are customer interactions with a call center.

* * * * *